US012776214B2

(12) United States Patent
Golov

(10) Patent No.: US 12,776,214 B2
(45) Date of Patent: Oct. 27, 2026

(54) GENERATING ICE HAZARD MAP BASED ON WEATHER DATA TRANSMITTED BY VEHICLES

(71) Applicant: Micron Technology, Inc., Boise, ID (US)

(72) Inventor: Gil Golov, Backnang (DE)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/495,668

(22) Filed: Oct. 26, 2023

(65) Prior Publication Data

US 2024/0054894 A1 Feb. 15, 2024

Related U.S. Application Data

(63) Continuation of application No. 17/319,488, filed on May 13, 2021, now Pat. No. 11,830,362.

(51) Int. Cl.

| | |
|---|---|
| ***G08G 1/0967*** | (2006.01) |
| ***G01W 1/10*** | (2006.01) |
| ***G01W 1/14*** | (2006.01) |
| ***G08G 1/0968*** | (2006.01) |
| ***G08G 1/0969*** | (2006.01) |

(52) U.S. Cl.

CPC ........ *G08G 1/096791* (2013.01); *G01W 1/10* (2013.01); *G01W 1/14* (2013.01); *G08G 1/096725* (2013.01); *G08G 1/096822* (2013.01); *G08G 1/0969* (2013.01)

(58) Field of Classification Search

CPC ....... G08G 1/096791; G08G 1/096725; G08G 1/096822; G08G 1/0969; G01W 1/10; G01W 1/14

See application file for complete search history.

(56) References Cited

U.S. PATENT DOCUMENTS

| | | | | |
|---|---|---|---|---|
| 10,134,278 | B1 | 11/2018 | Konrardy et al. | |
| 10,540,877 | B1 * | 1/2020 | Gersten | G06F 9/453 |
| 2011/0153742 | A1 * | 6/2011 | Sloop | G01C 21/3691 709/204 |
| 2014/0225750 | A1 | 8/2014 | Sloop et al. | |

(Continued)

FOREIGN PATENT DOCUMENTS

| | | |
|---|---|---|
| CN | 110336915 | 10/2019 |
| CN | 110497905 | 11/2019 |

(Continued)

*Primary Examiner* — Mohamed Barakat

(74) *Attorney, Agent, or Firm* — Greenberg Traurig

(57) ABSTRACT

Systems, methods, and apparatus related to determining ice hazards on roads based on crowdsourced data from vehicles. In one approach, a server receives weather data and location data from each of several vehicles. The weather data is timestamped when received. The server determines, using the location data, a geographic region in which each vehicle is located. The weather data is stored in a database associated with the respective geographic region for the vehicle that transmitted the weather data. The server periodically scans the database to select weather data received over a selected time period. The selected data is analyzed to determine whether an ice hazard exists for one or more regions. A communication is sent to vehicles in those regions having the determined ice hazard.

20 Claims, 6 Drawing Sheets

(56) References Cited

U.S. PATENT DOCUMENTS

| | | | | |
|---|---|---|---|---|
| 2016/0042644 | A1* | 2/2016 | Velusamy | G08G 1/096775 340/435 |
| 2018/0283895 | A1* | 10/2018 | Aikin | G01C 21/3415 |
| 2019/0189008 | A1* | 6/2019 | Langona | G08G 1/0141 |
| 2019/0294167 | A1 | 9/2019 | Kutila et al. | |
| 2019/0353499 | A1* | 11/2019 | Stenneth | G06F 3/04817 |
| 2020/0066144 | A1* | 2/2020 | Lorenz | G08G 1/0104 |
| 2020/0284594 | A1 | 9/2020 | Wang et al. | |
| 2020/0296558 | A1* | 9/2020 | Adare | H04W 68/005 |
| 2022/0024476 | A1* | 1/2022 | Lund | B60K 35/80 |
| 2022/0205807 | A1* | 6/2022 | Raut | B60W 60/005 |
| 2022/0366787 | A1 | 11/2022 | Golov | |

FOREIGN PATENT DOCUMENTS

| | | |
|---|---|---|
| DE | 102009019075 | 10/2010 |
| DE | 102015007036 | 12/2016 |
| EP | 3316007 | 5/2018 |

* cited by examiner

Database Records

| Location Segment | Time Stamp Counter | External Temperature [degrees C] | Rain Flag [y/n] | Car ID |
|---|---|---|---|---|
| 54 | 1000 | -1 | y | 678 |
| 30 | 1000 | +2 | y | 333 |
| 54 | 999 | 0 | n | 123 |
| … | … | … | … | … |

FIG. 2

Global Ice Hazard Table

| Location Segment | Ice Hazard [Y/N] |
|---|---|
| 1 | N |
| 2 | Y |
| 3 | Y |
| … | … |
| n | N |

FIG. 3

GENERATING ICE HAZARD MAP BASED ON WEATHER DATA TRANSMITTED BY VEHICLES

RELATED APPLICATIONS

The present application is a continuation application of U.S. patent application Ser. No. 17/319,488 filed May 13, 2021, the entire disclosures of which application are hereby incorporated herein by reference.

At least some embodiments disclosed herein relate to computing systems to guide vehicle operation in general, and more particularly, but not limited to generating road hazard (e.g., ice) data based on weather data transmitted by vehicles.

BACKGROUND

Crowdsourcing is a sourcing model in which entities can obtain services from a large, growing, and evolving group of users. Crowdsourcing delegates work or processes between participants to achieve a cumulative result. A key advantage of crowdsourcing is that unceasing tasks can be performed in parallel by large crowds of users.

Crowdsourcing has been used to improve navigation information and driving. For example, crowdsourcing has been used to improve traffic buildup information found in navigation apps. In such examples, the crowdsourced participants can be vehicle drivers. Crowdsourcing is just one of many technologies improving driving.

Another way to improve driving is via an advanced driver assistance system (ADAS). An ADAS is an electronic system that helps a driver of a vehicle while driving. An ADAS provides for increased car safety and road safety. An ADAS can use electronic technology, such as electronic control units and power semiconductor devices. Most road accidents occur due to human error. Thus, an ADAS, which automates some control of the vehicle, can reduce human error and road accidents. Such systems have been designed to automate, adapt and enhance vehicle systems for safety and improved driving. Safety features of an ADAS are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, provide pedestrian crash avoidance mitigation (PCAM), alert driver to other cars or dangers, provide a lane departure warning system, provide automatic lane centering, show field of view in blind spots, or connect to navigation systems.

BRIEF DESCRIPTION OF THE DRAWINGS

The embodiments are illustrated by way of example and not limitation in the figures of the accompanying drawings in which like references indicate similar elements.

FIG. 2 shows an example of records including weather data that are stored in a database, in accordance with some embodiments.

FIG. 3 shows a hazard table storing an ice hazard status for various location segments, in accordance with some embodiments.

DETAILED DESCRIPTION

Figure 1:
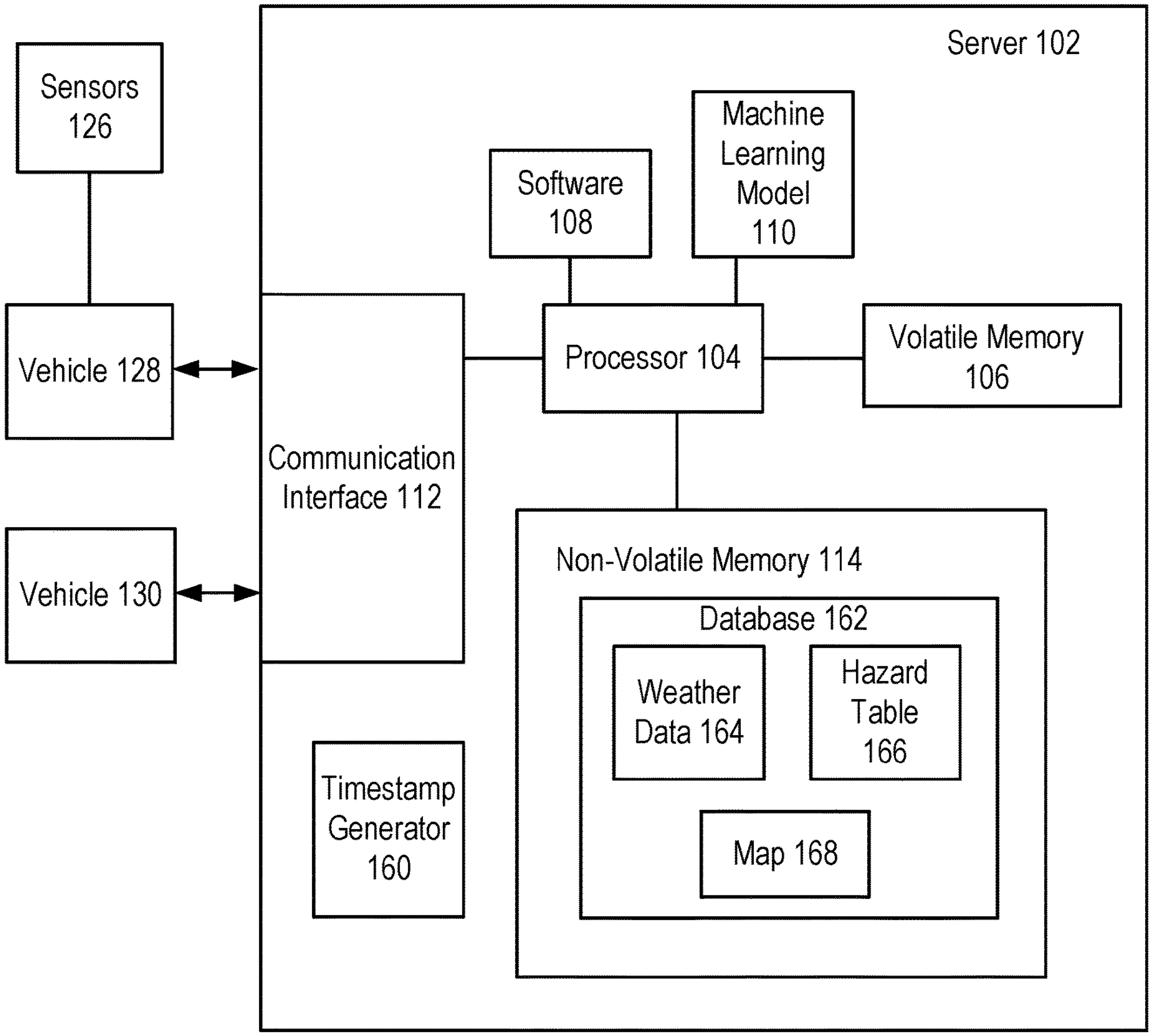
FIG. 1 shows a server that stores weather data collected from vehicles via a communication interface, in accordance with some embodiments.

The following disclosure describes various embodiments for generating road hazard data (e.g., data regarding potential ice hazards) based on weather data transmitted by vehicles (e.g., weather data sent from vehicles to a cloud server). In at least some embodiments, temperature and rain data is collected from each of several vehicles. A crowdsourcing approach is used to aggregate this weather data for identifying and/or making predictions regarding potential ice hazards on the roads on which the vehicles are traveling. In one embodiment, these predictions can be used to control the operation of vehicles that are traveling in a hazardous region so that the vehicles operate more safely.

Prior approaches to determining road hazards related to adverse weather typically rely on data provided from a central source. For example, data regarding road conditions such as icing are often based on very general predictions made by a central weather authority. However, due to the rapidly changing nature of weather, and highly variable road conditions that differ from one location to another, vehicles traveling along roads are not able to adequately determine potential ice and other road hazards. In addition, existing vehicles are not themselves able to make predictions regarding ice and other hazards. For example, the sensors and computing systems of the vehicles are not suitable or configured for predicting ice hazards. Instead, the sensors are dedicated to navigation and collision avoidance for the vehicles (e.g., control of vehicle direction and distance from other objects).

To address these and other technical problems, potential ice hazards on roads being traveled by vehicles are identified based on weather data collected from at least a portion of the vehicles traveling on the roads. In one embodiment, a method includes: receiving weather data (e.g., temperature data, and data regarding detection of rain by sensor(s) of a vehicle) and location data (e.g., GPS coordinates) from each of a plurality of vehicles, each vehicle located in one of a plurality of geographic regions (e.g., regions that are defined as portions of a two-dimensional map that includes roads); timestamping the weather data when received; determining, based on the location data, a geographic region in which each respective vehicle is located; storing, in a database, the respective weather data from each vehicle associated with the respective geographic region for the vehicle; and periodically scanning the database (e.g., scanning by a map server that communicates with vehicles on the road).

In one embodiment, the periodic scanning includes, for each of the respective geographic regions: selecting weather data that is stamped with a receipt time within a defined time period (e.g., the last 2-10 hours); determining, using the selected weather data, whether rain is indicated, and whether a temperature is less than a threshold (e.g., less than 5 degrees Celsius, or less than zero degrees Celsius); and in response to determining that rain is indicated, and that the temperature is less than the threshold, setting a hazard flag for the geographic region to indicate an ice hazard. In various examples, the hazard flag can be used to notify drivers, vehicles (e.g., autonomous vehicles), and/or computing devices associated with road service (e.g., a central command server that controls autonomous vehicles that spread salt on roads, such as communicating to the vehicles where to salt, a quantity of salt to use, and/or a rate or frequency of salting to perform). The hazard flag state also can trigger sending of communications and/or other actions.

In one embodiment, a cloud server crowdsources data from multiple vehicles. Each vehicle is equipped with a system that periodically measures local weather conditions (e.g., external temperature, and rain situation). The vehicle also determines its current location (e.g., using a GPS device). In one example, the vehicle is equipped with a cloud communication module that periodically sends the measured weather conditions and location to the cloud server. Optionally, the vehicle also sends a system identifier (ID) (e.g., a system serial number) to the server.

The cloud server maintains a timestamp counter that counts, for example, +1 every defined period of time (e.g., every 60 seconds). When each data packet from a vehicle is received by the cloud server, a timestamp counter is added to the data (e.g., the timestamp is stored with the data as part of a data entry in a database). Each data packet is also associated with a location segment identifier determined by the cloud server. For example, the server determines the location by analyzing GPS location information from the vehicle sending the data packet, and determines to which predefined location segment identifier the vehicle corresponds based on its GPS location coordinates. The received weather data is associated with that location segment (e.g., stored in a database or a map).

FIG. 1 shows a server 102 that stores weather data collected from vehicles via a communication interface 112, in accordance with some embodiments. The vehicles include, for example, vehicles 128, 130. At least some of the vehicles generate weather data. In one example, the weather data includes data regarding a temperature external to the vehicle, and/or data regarding an indication of a presence or extent of precipitation at the vehicle. In one example, the vehicles may include cars and/or trucks, and the vehicles may be manually driven and/or autonomous.

Weather data received from the vehicles is stored as weather data 164 in database 162. As weather data is received from a vehicle, a timestamp is associated with the data and stored as part of weather data 164. In one example, the timestamp is generated by time stamp generator 160. In another example, the timestamp is generated by the vehicle itself and sent with the weather data.

Vehicle 128 sends location data to server 102 when providing weather data. In one example, server 102 associates and stores the location data with the corresponding weather data in database 162 as part of weather data 164.

Communication interface 112 is, for example, a 5G wireless modem. In one example, interface 112 is a radio transceiver. In one example, vehicles 128, 130 each include a communication interface (not shown) to wirelessly communicate with communication interface 112.

Vehicle 128 includes one or more sensors 126. For example, sensors 126 can include rain sensors. In one example, the rain sensors can be the same as or similar to existing rain sensors used to automatically activate windshield wipers when water is detected on a windshield of the vehicle.

Sensors 126 also can include temperature sensors. In one example, the temperature sensor is located on a vehicle so that the temperature of the atmosphere external to the vehicle can be determined.

Optionally, sensors 126 can include one or more cameras. Image data can be transmitted to server 102 as part of weather data 164. In one embodiment, processor 104 can execute a machine learning model 110 to analyze the image data and provide an output. In one example, the output can indicate a status of precipitation at the vehicle. For example, the output can indicate that rain is falling, snow is falling, or sleet is falling at the vehicle location. In one example, machine learning model 110 uses volatile memory 106 to temporarily store data used during analysis of weather data 164.

In one embodiment, processor 104 executes software 108 to analyze weather data 164. Based on this analysis, processor 104 determines whether there is a potential ice hazard in one or more geographic regions in which vehicles are traveling.

In one embodiment, in response to determining the existence of an ice hazard, processor 104 generates and sends a communication to one or more vehicles. In one example, processor 104 compares a current location of vehicle 130 to location data stored in weather data 164. Based on this comparison, processor 104 determines that vehicle 130 is in the geographic region for which an ice hazard has been identified. In response to this determination, processor 104 sends a communication to vehicle 130 indicating the existence of the ice hazard.

In one example, the communication sent to vehicle 130 causes a display on a display device (not shown) of vehicle 130 that indicates the ice hazard. In one example, the communication causes a change in the operation of one or more functions of vehicle 130. In one example, the operation is reconfigured to so that vehicle 130 is driven more conservatively than when operating in a normal driving mode in dry weather (e.g., a speed is lowered, and/or the following distance to other vehicles is increased).

During the operation of server 102, processor 104 stores data in non-volatile memory 114. This data includes data in database 162, which stores data records corresponding to weather data 164. Database 162 also stores hazard table 166, which includes a list of hazards identified by processor 104 based on analysis of weather data 164.

In one embodiment, hazard table 166 includes a list of hazard states, each associated with a corresponding location. In one example, the corresponding location is an identifier of a location segment. For example, the location segment corresponds to a geographic region in which vehicles are traveling on one or more roads for which an ice hazard has been determined. In other examples, the location segment may correspond to other types of locations associated with vehicles traveling on at least one road.

In one example, the hazard state is simply a binary yes or no as regards the existence of a potential ice hazard. In one example, the hazard state is a numerical or other value that indicates an extent of risk associated with icing.

Optionally, database 162 stores map 168. In one example, map 168 stores location coordinates for roads. In one example, map 168 relates the location of the roads to defined location segments, as discussed above. In one example, processor 104 uses map 168 to determine whether a data record of weather data 164 corresponds to a given location segment. In one example, the location segment identifier of hazard table 166 corresponds to a defined location segment in map 168.

In one embodiment, processor 104 generates map 168 to include a respective hazard status for each of several geographic segments defined in map 168. Each hazard status can be determined based on analysis of weather data 164.

In one embodiment, each vehicle sends an identifier with its weather data. In one example, the identifier uniquely identifies the vehicle. In one example, the identifier corresponds to a type of sensor used to collect the temperature and/or rain or other weather data.

FIG. 2 shows an example of database records including weather data that are stored in a database, in accordance with some embodiments. These database records are an example of data records stored as weather data 164 in database 162.

In one example, the location segment value for each record identifies and corresponds to a defined location segment of map 168. In one example, the timestamp counter is a timestamp generated by time stamp generator 160.

In one example, the external temperature for each record is a data value generated by one or more of sensors 126. In one example, the external temperature is determined by a processing device (not shown) of vehicle 128 using data collected by sensors 126.

In one example, the rain flag is a binary status indication corresponding to whether vehicle 128 is reporting detection of water by one or more sensors 126. In one example, the rain flag is determined by a processing device of vehicle 128 based on data collected by one or more sensors 126.

In one example, the car identifier for each record is an identifier of the vehicle that sent the weather data in the record.

FIG. 3 shows a hazard table storing an ice hazard status for various location segments, in accordance with some embodiments. The illustrated hazard table is an example of hazard table 166. The location segments of the illustrated hazard table correspond to the location segments of the database records illustrated in FIG. 2. In the illustrated hazard table, each location segment is associated with an indication of an ice hazard.

Figure 4:
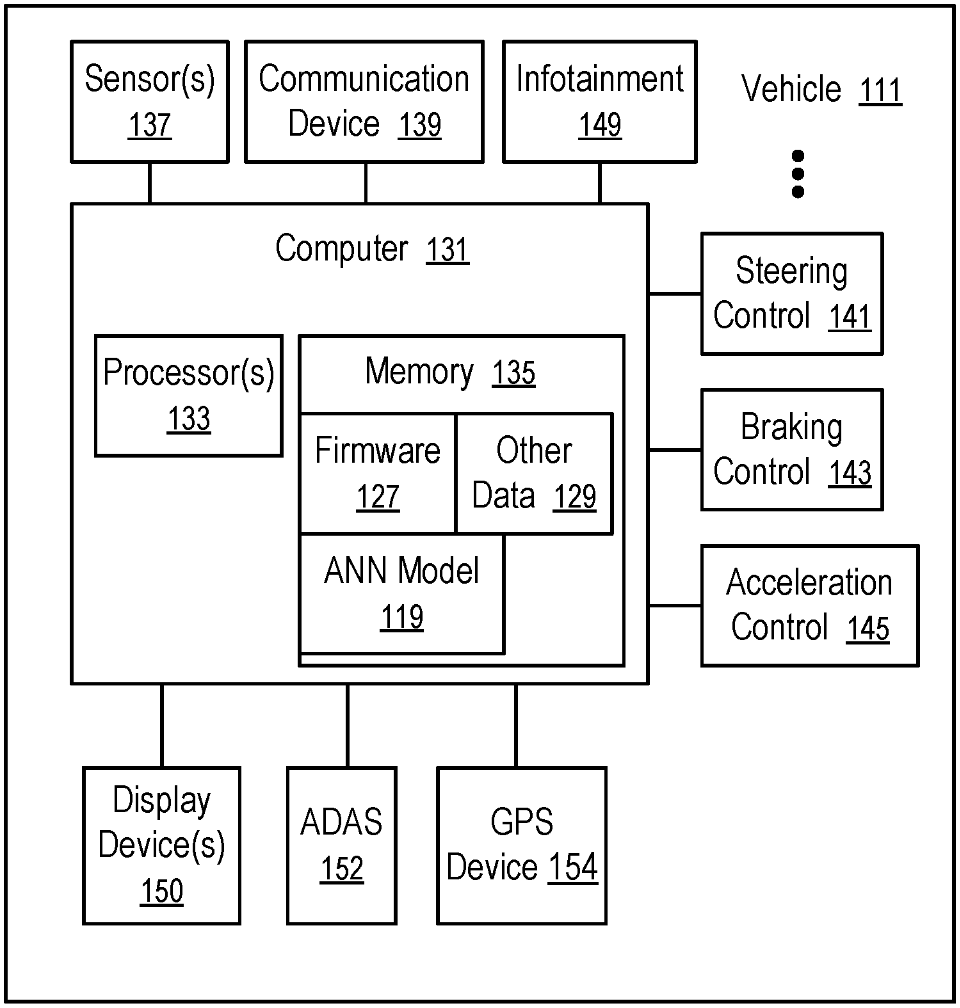
FIG. 4 shows an example of a vehicle including sensors to collect weather data, in accordance with some embodiments.

FIG. 4 shows an example of a vehicle 111 including sensors 137 to collect weather and other data, in accordance with some embodiments. Vehicle 111 optionally uses an artificial neural network (ANN) model. In one example, the ANN model is used to generate weather data that is sent to server 102 of FIG. 1. The ANN model uses data from sensors 137 as input. Sensors 137 are an example of sensors 126 of FIG. 1.

Vehicle 111 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc.

The computer 131 of the vehicle 111 includes one or more processors 133, memory 135 storing firmware (or software) 127, ANN model 119, and other data 129.

Vehicle 111 also includes display device(s) 150, an advanced driver assistance system (ADAS) 152, and a GPS device 154. In one example, GPS device 154 generates location data that is sent to server 102. In one example, communications sent by server 102 to vehicle 111 cause display of information on display device 150. The displayed information indicates one or more various road hazards. In one example, a communication sent by server 102 causes ADAS 152 to change a function of vehicle 111 consistent with safely handling an identified ice hazard.

In one example, firmware 127 is updated by an over-the-air update in response to a determination by server 102 that vehicle 111 is driving in or predicted to enter a region having an ice hazard. Alternatively, and/or additionally, other firmware of various computing devices or systems of vehicle 111 can be updated.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies data associated with weather being experienced by vehicle 111. Data from this identification and/or classification can be included in weather data sent from vehicle 111 to server 102 to determine if a road hazard such as ice exists.

In one embodiment, a communication sent from server 102 causes vehicle 111 to activate and/or adjust one of the vehicle controls 141, 143, and 145. In one embodiment, the response by vehicle 111 is an action performed by the vehicle where the action has been configured based on an update or other command from server 102 (e.g., the command can be generated by server 102 in response to determining an ice hazard). In one embodiment, configuration of the vehicle is performed by updating firmware of vehicle 111. In one embodiment, the configuration of the vehicle includes updating of the computer model stored in vehicle 111 (e.g., ANN model 119).

In one embodiment, the communication sent from server 102 causes a navigation system of vehicle 111 to select a route that avoids one or more ice hazards identified by the communication.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving or provision of advanced driver assistance.

In one example, data obtained from a sensor of vehicle 111 may be an image that captures an object using a camera that images using lights visible to human eyes, or a camera that images using infrared lights, or a sonar, radar, or LIDAR system. In one embodiment, image data obtained from at least one sensor of vehicle 111 is part of the collected data analyzed to generate weather data (e.g., determining if it is raining). In some instances, the ANN model is configured for a particular vehicle 111 based on the sensor and other collected data.

Figure 5:
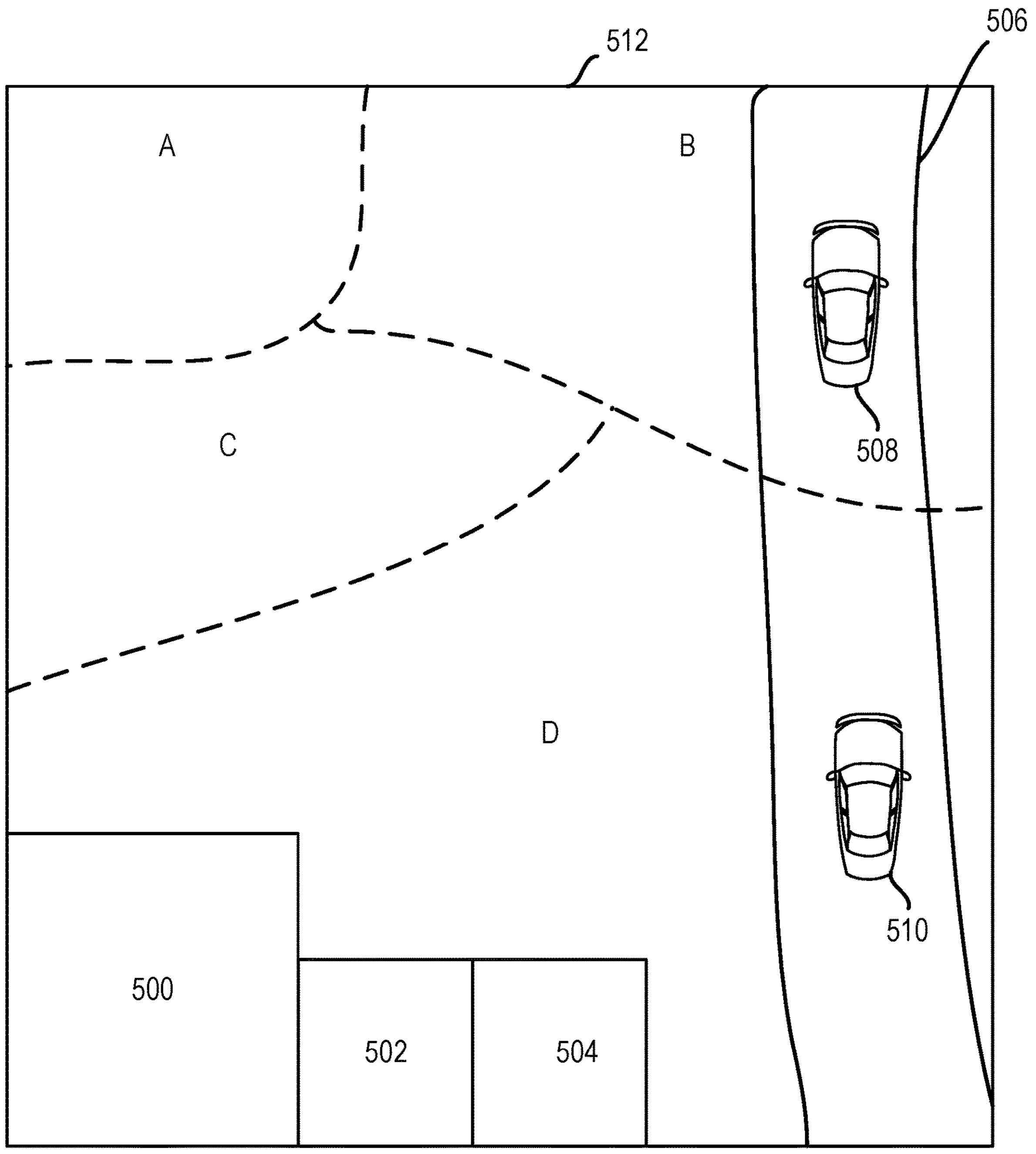
FIG. 5 shows a geographic map divided into defined segments, in accordance with some embodiments.

FIG. 5 shows a geographic map 512 divided into defined segments, in accordance with some embodiments. Map 512 is an example of map 168. In one example, map 512 represents a portion of the earth on which various roads are located, such as road 506. Vehicles travel on these roads, including vehicles 508, 510. Vehicle 508 is traveling ahead of vehicle 510.

Map 512 may be partitioned in various ways into defined segments. In one example, each defined segment corresponds to a geographic area of map 512. In one example, data regarding how map 512 is defined into segments is stored in non-volatile memory 114 of server 102.

In one example, as illustrated, map 512 can be divided into defined segments A, B, C, D. In one example, these segments can be defined with arbitrary boundaries. In another example, map 512 can be divided into rectangular segments 500, 502, 504. The rectangular segments can be of varying sizes, or can be of a uniform size such as segments 502, 504. In one example, the defined segments correspond to the location segments of FIGS. 2 and 3.

In one example, vehicle 508 was previously located in segment D, and is currently located in segment B traveling on road 506. Vehicle 510 is currently located in segment D, and is traveling on road 506 towards segment B.

Vehicle 508 is an example of vehicle 128. Vehicle 510 is an example of vehicle 130. Vehicle 508 has transmitted weather data and location data to a server such as server 102, such as described above. The server has associated an ice hazard status with segment B based on this data. The server has further predicted that vehicle 510 will enter segment B within a defined time period (e.g., in less than 5-30 minutes from the current time). Based on this prediction and the ice hazard status indicating a presence of ice, the server sends a communication to vehicle 510. In response to receiving the communication, vehicle 510 performs one or more actions, such as discussed above for safely handling an ice hazard.

In another example, the server determines that vehicle 510 is already presently located in segment B. In response to this determination and the ice hazard status indicating the presence of ice, the server sends the communication to vehicle 510 to cause one or more actions to improve safe operation of vehicle 510.

In one embodiment, server 102 stores map 512 in database 162. Server 102 periodically scans database 162 to determine potential ice hazards in map 512. The ice hazards are determined based on determining the presence of rain at a location at which a vehicle traveling, and also determining that a temperature at the location is less than the threshold (e.g., less than zero degrees Celsius). In one embodiment, the potential ice hazards are further determined based on determining that the temperature has been less than the threshold for at least a determined time period (e.g., more than 10-40 minutes).

In one embodiment, server 102 selects a prior time period (e.g., the prior 3-5 hours). Server 102 retrieves data records from database 162 that correspond to weather data received from vehicles within this time period. In one example, server 102 uses timestamps associated with the data to select records for retrieval. Server 102 makes a determination regarding potential size hazards based on this retrieved data.

In one embodiment, server 102 is a cloud server. Software executing on the cloud server periodically scans database 162 and determines potential ice hazards for each of several location segments. As an example, for each location segment 1 to n, data is selected only from the last x minutes/hours (e.g., in the last 10 hours). This is determined using the timestamp counter.

If the rain flag is set to "y" (see, e.g., FIG. 2) for at least one data entry in the selected data, and the temperature in any given entry is below a predefined value (e.g., less than two degrees Celsius), this indicates that is was raining during the last x minutes in that location segment, and the temperature was in the freezing range. In that case, a hazard flag is set to "Y" within a global ice hazard table (see, e.g., FIG. 3) under the current location segment entry, otherwise the flag is set to "N" in that entry. The foregoing is repeated for each location segment.

In one embodiment, server 102 uses the ice hazards determined above for reporting ice hazard data to vehicles (e.g., reporting to other than those vehicles that provided the weather data). For example, in order to receive the ice hazard data, a receiving vehicle (e.g., vehicle 130) is not required to be equipped with the same system for collecting weather data as described above for vehicle 128. Instead, a more-simplified system, and/or a mobile phone application of a driver or passenger of the vehicle is sufficient to receive the ice hazard data.

In one example, a communication-receiving system of vehicle 130 and/or mobile phone application has a GPS device, and a connection to server 102. Periodically, vehicle 130 and/or the mobile phone application sends a current location to server 102. Server 102 compares the received location of vehicle 130 and/or the mobile phone application to an ice hazard status determined for the location segment in which the vehicle 130 and/or the mobile phone application is located.

In one example, a request for a road hazard status is sent by vehicle 130 and/or the mobile phone application to server 102. The request is analyzed by server 102. This analysis includes using GPS location data received as part of the request to determine in which predefined segment location the vehicle and/or mobile phone is located.

Server 102 fetches the relevant ice hazard flag from the global ice hazard table (e.g., hazard table 166), and sends the flag status back to the vehicle or the mobile phone application. A flag status of "Y" indicates to the vehicle or mobile phone application that an ice hazard exists on the road. As a result of this communication, the driver and/or the autonomous driving system are notified and may take one or more responsive actions (e.g., automatically slow down the vehicle, and/or automatically engage improved traction control for wheels of the vehicle).

Figure 6:
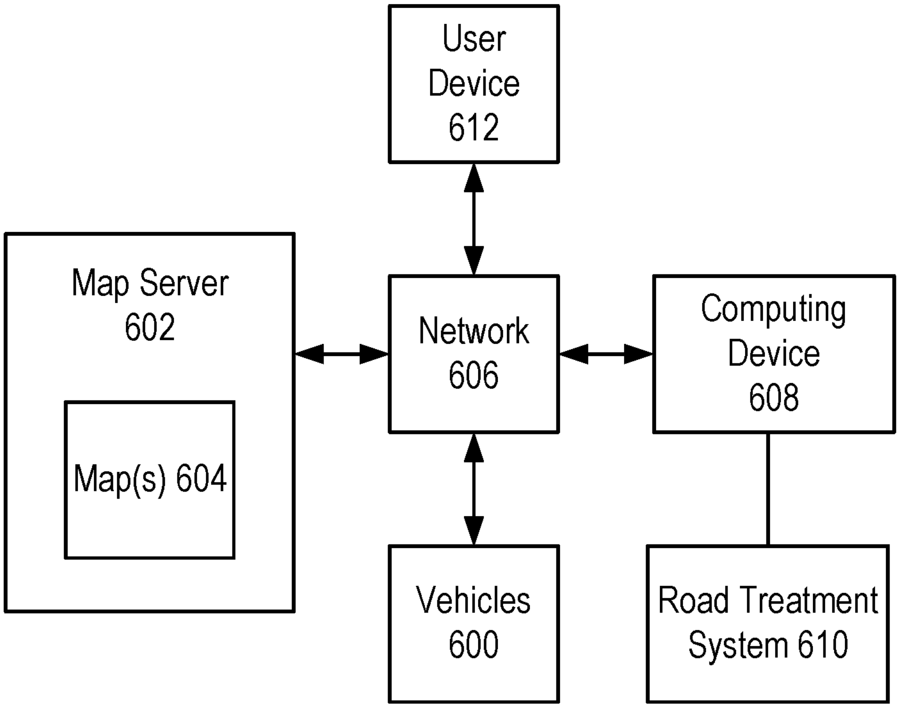
FIG. 6 shows a map server that communicates with vehicles, a user device, and a computing device that controls a road treatment system, in accordance with some embodiments.

FIG. 6 shows a map server 602 that communicates with vehicles 600, a user device 612, and a computing device 608 that controls a road treatment system 610, in accordance with some embodiments. Map server 602 is an example of server 102. In one example, vehicles 600 include vehicles 128, 130.

In one embodiment, each of vehicles 600 periodically sends weather data to map server 602. In one example, the weather data is sent by each vehicle every 30-180 seconds.

Map server 602 stores one or more maps 604. In one example, maps 604 include map 168. Map server 602 communicates using network 606. Network 606 includes, for example, wireless networks for communicating with vehicles 600. Network 606 includes, for example, wired and/or wireless networks for communicating with user device 612 and computing device 608.

User device 612 is, for example, a mobile device or laptop computer. In one example, mobile device executes the mobile phone application to which the ice hazard data is sent, as described above. User device 612 includes a display device on which a notification and/or other information regarding an ice hazard can be presented in response to receiving a communication from map server 602.

Computing device 608 is, for example, a server managed by a central governmental authority. In one example, the server controls road treatment system 610 based on data received from map server 602. In one example, the road treatment system controls the application of salt to roads based on ice hazard data received from map server 602. In one example, road treatment system 610 controls autonomous vehicles that apply salt to the roads.

In one example, ice hazard data is reported by map server 602 in the same or similar way as reported to vehicles 600. In one example, ice hazard data is reported by map server 602 to computing device 608 in response to receiving a request from computing device 608 regarding the ice hazard status for a specific location segment.

In one embodiment, map server 602 generates a graphical hazard map based on real-time data stored in a global ice hazard table. The graphical hazard map can be sent to user device 612, computing device 608, and/or vehicles 600.

Figure 7:
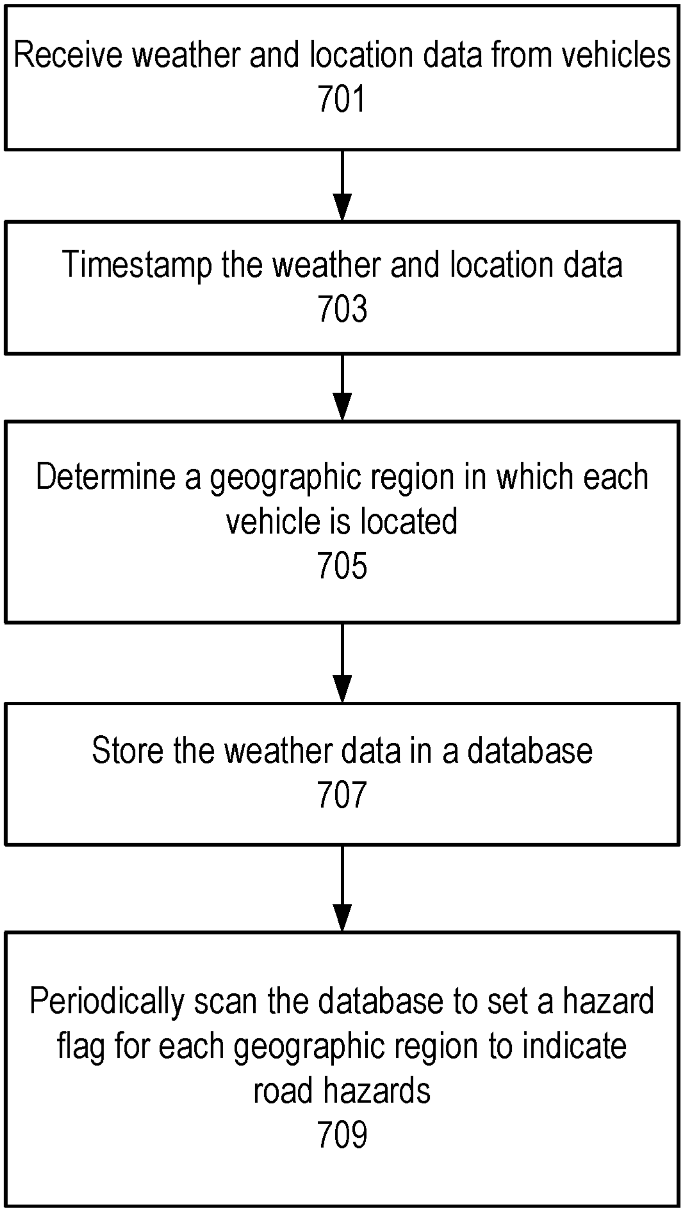
FIG. 7 shows a method for determining a road hazard status for various geographic regions, in accordance with some embodiments.

FIG. 7 shows a method for determining a road hazard status for various geographic regions in which vehicles travel, in accordance with some embodiments. For example, the method of FIG. 7 can be implemented in the system of FIG. 1. In one example, server 102 determines the road hazard status for each of geographic regions defined by map 168.

The method of FIG. 7 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 7 is performed at least in part by one or more processing devices (e.g., processor 104 of FIG. 1).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 701, weather and location data is received from vehicles. In one example, weather data 164 is received from vehicle 128.

At block 703, the received weather and location data is timestamped. In one example, the data is timestamped by timestamp generator 160.

At block 705, a geographic region in which each vehicle is located is determined. In one example, the geographic region for vehicle 128 is determined based on GPS data provided by vehicle 128. Server 102 identifies a defined location segment that corresponds to the geographic region.

At block 707, the weather data is stored in a database. In one example, server 102 stores weather data received from vehicle 128 in database 162. The weather data is stored in association with the defined location segment that corresponds to the determined geographic region.

At block 709, the database is periodically scanned to set a hazard flag for each geographic region. The hazard flag indicates one or more road hazards, such as a potential ice hazard. In one example, the hazard flag is set in hazard table 166.

In one embodiment, a system includes: a communication interface (e.g., 112); at least one memory (e.g., non-volatile memory 114); and at least one processing device (e.g., processor 104) configured to: store, in the memory, data regarding defined geographic segments; receive, by the communication interface, weather data (e.g., 164) and location data from a first vehicle (e.g., 128, 508) traveling in a first segment (e.g., segment B of FIG. 5) of the geographic segments; identify, based on the received location data, the first segment; associate, in the memory, the received weather data with the first segment; determine, based on the received weather data, a hazard status for the first segment; associate, in the memory, the hazard status with the first segment; generate, based on the hazard status, a communication for a second vehicle (e.g., 130, 510) associated with the first segment (e.g., currently located in or predicted to enter the first segment); and send, by the communication interface to the second vehicle, the communication, where the second vehicle is configured to perform at least one action in response to receiving the communication.

In one embodiment, determining the hazard status includes generating a status or prediction regarding a presence of ice on a road located in the first segment.

In one embodiment, the weather data includes temperature data and an indication regarding a presence of rain in the first segment.

In one embodiment, the hazard status is at least one of an absence of ice, a presence of ice, a risk of ice, or a prediction regarding a future presence of ice.

In one embodiment, the processing device is further configured to: in response to receiving the weather data from the first vehicle, generate a timestamp (e.g., using timestamp generator 160); and associate, in the memory, the timestamp with the weather data.

In one embodiment, the processing device is further configured to: scan the memory to determine a hazard status for each of the geographic segments; and determine, based on the scan, that the hazard status for the first segment corresponds to a risk of ice on a road in the first segment.

In one embodiment, the action performed by the second vehicle includes at least one of reducing speed, changing a planned route of the second vehicle, changing a driving mode of the second vehicle, increasing a following distance of the second vehicle to other vehicles, updating a configuration regarding data collection by sensors of the second vehicle, or updating a configuration of an advanced driver assistance system (ADAS) (e.g., ADAS 152) of the second vehicle.

In one embodiment, the processing device is further configured to: generate a map (e.g., 168, 604) that includes a respective hazard status for each of the geographic segments; and send, by the communication interface, the map to a computing device (e.g., 608) configured to control treatment of road surfaces located in the geographic segments based on the respective hazard status for each segment.

In one embodiment, each of the geographic segments is a defined geographic area of a map (e.g., segments A, B, C, D of FIG. 5).

In one embodiment, the processing device is further configured to: in response to receiving the weather data, generate a timestamp; and predict that the second vehicle will enter the first segment within a defined time period from the timestamp; where the communication is sent to the second vehicle in response to the prediction.

In one embodiment, the processing device is further configured to: make a determination that the second vehicle is located in the first segment, or is within a defined distance of the first segment; where the communication is sent to the second vehicle in response to the determination.

In one embodiment, an apparatus includes: a communication interface; at least one memory configured to store a database (e.g., 162); and at least one processing device configured to: store, in the database, data regarding defined segments, each defined segment corresponding to a geographic area; receive, by the communication interface, temperature data, rain data, and location data from a first vehicle (e.g., data from vehicle 128 based on sensors 126 and/or GPS device 154); identify, based on the location data, a first segment of the defined segments; associate, in the database, the temperature data and the rain data with the first segment; determine, at least based on the temperature data and the rain data, a potential ice hazard in the first segment; and in response to determining the potential ice hazard, send, by the communication interface, a communication to a second vehicle.

In one embodiment, the processing device is further configured to: periodically scan the database to determine potential ice hazards; where the potential ice hazard in the first segment is determined during one of the periodic scans.

In one embodiment, determining the potential ice hazard includes: determining, based on the rain data, a presence of rain; and determining, based on the temperature data, that a temperature is less than a threshold.

In one embodiment, determining the potential ice hazard includes: selecting a prior time period; retrieving, from the database, weather data records that each have a timestamp within the prior time period, where the weather data records correspond to weather data received from a plurality of vehicles including the first vehicle; and determining that at least one of the retrieved weather data records indicates a presence of rain, and a temperature less than a threshold.

In one embodiment, the processing device is further configured to timestamp the weather data when received from the plurality of vehicles.

In one embodiment, the processing device is further configured to, prior to sending the communication, determine that the second vehicle is located in the first segment, or is predicted to enter the first segment.

In one embodiment, a method includes: receiving weather data and location data from each of a plurality of vehicles (e.g., vehicles 128, 600), each vehicle located in one of a plurality of geographic regions; timestamping the weather data when received; determining, based on the location data, a geographic region in which each respective vehicle is located; storing, in a database, the respective weather data from each vehicle associated with the respective geographic region for the vehicle; and periodically scanning the database, the scanning including, for each of the respective geographic regions: selecting weather data that is stamped with a time within a defined time period; determining, using the selected weather data, whether rain is indicated, and whether a temperature is less than a threshold; and in response to determining that rain is indicated, and that the temperature is less than the threshold, setting a hazard flag for the geographic region to indicate an ice hazard.

In one embodiment, the method further includes storing a hazard table (e.g., 166) including the respective hazard flag for each of the geographic regions.

In one embodiment, the method further includes: receiving a first location for a first vehicle; in response to receiving the first location, identifying the respective geographic region in which the first vehicle is located; and determining, using the hazard table, whether the respective hazard flag for the identified geographic region indicates an ice hazard.

In one embodiment, the method further includes, in response to determining that the respective hazard flag for the identified geographic region indicates the ice hazard, sending a communication to the first vehicle, where the communication causes the first vehicle to perform an action.

In one embodiment, the method further includes: receiving a request from the first vehicle for ice hazard data; where the communication sent to the first vehicle is in reply to the request.

In one embodiment, the method further includes, in response to determining that the respective hazard flag for the identified geographic region indicates the ice hazard, sending a communication to a computing device of a user, where the communication causes a warning display to the user regarding the ice hazard.

In one embodiment, the method further includes: receiving an identifier from each of the vehicles; and associating, in the database, each identifier with the weather data received from the respective vehicle.

Communication networks described herein, such as network 606, can include at least a wide area network (WAN), a local area network (LAN), the intranet, a mobile wireless network such as 4G or 5G, an extranet, the Internet, and/or any combination thereof. Nodes of the networked system (e.g., vehicles 600, user devices, and computing devices) can each be a part of a peer-to-peer network, a client-server network, a cloud computing environment, or the like.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and/or operations may be described as being performed by or caused by software code to simplify description. However, those skilled in the art will recognize what is meant by such expressions is that the functions and/or operations result from execution of the code by one or more processing devices, such as a microprocessor, application-specific integrated circuit (ASIC), graphics processor, and/or a field-programmable gate array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, software development kit (SDK) component, web services, or other specific application, component, program, object, module or sequence of instructions (sometimes referred to as computer programs). Invocation interfaces to these routines can be exposed to a software development community as an application programming interface (API). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., compact disk read-only memory (CD ROMs), digital versatile disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices and/or managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A device, comprising:

at least one processor; and memory storing instructions configured to instruct the at least one processor to:

communicate with a plurality of vehicles to receive data configured to identify locations of the vehicles and operating conditions of the vehicles;

determine, from the operating conditions of the vehicles, weather hazard statuses at the locations, wherein a determination of the weather hazard statuses comprises predicting at least one ice hazard on a road in a geographic segment of the locations, wherein the predicting of the at least one ice hazard on the road is based at least in part on rain fall detected by one of the vehicles in the geographic segment and a temperature of the geographic segment, wherein the predicting the at least one ice hazard on the road further comprises a determination that the temperature of the geographic segment is less than a threshold temperature for at least a determined time period; and update a map to indicate the weather hazard statuses, wherein the update to the map is configured to cause at least one of the plurality of vehicles at a location with a weather hazard status to, based on the update to the map, reduce speed, increase a following distance to another vehicle, change a driving mode, or change a configuration of an advanced driver assistance system (ADAS), or any combination thereof.

2. The device of claim 1, further comprising:

an interface configured to send a communication to a vehicle in a geographic segment that contains the locations, the communication configured to identify the weather hazard statuses.

3. The device of claim 2, wherein the interface is further configured to receive the data configured to identify the locations of the vehicles and the operating conditions of the vehicles.

4. The device of claim 3, wherein the operating conditions are related to activation of windshield wipers of the plurality of vehicles.

5. The device of claim 4, wherein the at least one processor is further configured to receive information indicative of temperatures in the geographic segment; and the weather hazard statuses are determined based at least in part on the temperatures and the operating conditions that are indicative of rain at the locations.

6. The device of claim 5, wherein the information indicative of temperatures in the geographic segment is received from the plurality of vehicles.

7. The device of claim 5, wherein the weather hazard statuses relate to ice hazards.

8. The device of claim 7, wherein the at least one processor is further configured to predict the ice hazards based on rain fall in the geographic segment, indicated by the operating conditions of the vehicles, and temperatures in the geographic segment.

9. The device of claim 8, wherein the communication is configured to cause the vehicle to reduce speed, change a route, change a driving mode, increase a following distance to another vehicle, or change a configuration of an advanced driver assistance system (ADAS), or any combination thereof.

10. The device of claim 8, wherein the at least one processor is further configured to predict entry of the vehicle into the geographic segment; and the communication is sent in response to a prediction of the entry of the vehicle into the geographic segment.

11. The device of claim 8, wherein the processing device is further configured to determine a location of the vehicle being in the geographic segment; and the communication is sent in response to the location of the vehicle being determined to be in the geographic segment.

12. A method, comprising:

communicating, by a computing device, with a plurality of vehicles to receive data configured to identify locations of the vehicles and operating conditions of the vehicles;

determining, by the computing device from the operating conditions of the vehicles, weather hazard statuses at the locations, wherein the determining of the weather hazard statuses comprises predicting at least one ice hazard on a road in a geographic segment of the locations, wherein the predicting of the at least one ice hazard on the road is based at least in part on rain fall detected by one of the vehicles in the geographic segment and a temperature of the geographic segment, wherein the predicting the at least one ice hazard on the road further comprises a determining that the temperature of the geographic segment is less than a threshold temperature for at least a determined time period; and updating, by the computing device, a map to indicate the weather hazard statuses, wherein the updating the map is configured to cause at least one of the plurality of vehicles at a location with a weather hazard status to, based on the update to the map, reduce speed, change a driving mode, increase a following distance to another vehicle, or change a configuration of an advanced driver assistance system (ADAS), or any combination thereof.

13. The method of claim 12, further comprising:

sending, by the computing device, a communication to a vehicle in a geographic segment that contains the locations, the communication configured to identify the weather hazard statuses.

14. The method of claim 13, wherein the operating conditions are related to activation of windshield wipers of the plurality of vehicles; and the method further comprises:

receiving, in the computing device, information indicative of temperatures in the geographic segment;

wherein the weather hazard statuses are determined based at least in part on the temperatures and the operating conditions that are indicative of rain at the locations.

15. The method of claim 14, wherein the weather hazard statuses relate to ice hazards; and the method further comprises:

predicting, by the computing device, the ice hazards based on rain fall in the geographic segment, indicated by the operating conditions of the vehicles, and temperatures in the geographic segment.

16. The method of claim 15, wherein the communication is configured to cause the vehicle to reduce speed, change a route, change a driving mode, increase a following distance to another vehicle, or change a configuration of an advanced driver assistance system (ADAS), or any combination thereof.

17. The method of claim 15, further comprising:

predicting entry of the vehicle into the geographic segment;

wherein the communication is sent in response to a prediction of the entry of the vehicle into the geographic segment.

18. The method of claim 15, further comprising:

determining a location of the vehicle being in the geographic segment;

wherein the communication is sent in response to the location of the vehicle being determined to be in the geographic segment.

19. A non-transitory computer storage medium storing instructions which, when executed by a computing device, cause the computing device to perform a method comprising:

communicating, by the computing device, with a plurality of vehicles to receive data configured to identify locations of the vehicles and operating conditions of the vehicles;

determining, by the computing device from the operating conditions of the vehicles, weather hazard statuses at the locations, wherein the determining of the weather hazard statuses comprises predicting at least one ice hazard on a road in a geographic segment of the locations, wherein the predicting of the at least one ice hazard on the road is based at least in part on rain fall detected by one of the vehicles in the geographic segment and a temperature of the geographic segment, wherein the predicting the at least one ice hazard on the road further comprises a determining that the temperature of the geographic segment is less than a threshold temperature for at least a determined time period; and sending, by the computing device, a communication to a vehicle in a geographic segment that contains the locations, the communication configured to identify the weather hazard statuses, wherein the communication to the vehicle is configured to cause the vehicle to, based on the update to the map, reduce speed, change a driving mode, increase a following distance to another vehicle, or change a configuration of an advanced driver assistance system (ADAS), or any combination thereof.

20. The non-transitory computer storage medium of claim 19, wherein the operating conditions are indicative of activation of windshield wipers of the plurality of vehicles.

* * * * *